(12) United States Patent
Cleveland et al.

(10) Patent No.: US 6,720,551 B2
(45) Date of Patent: Apr. 13, 2004

(54) FLEXURE ASSEMBLY FOR A SCANNER

(75) Inventors: Jason P. Cleveland, Ventura, CA (US); David Grigg, Glastonbury, CT (US)

(73) Assignee: Veeco Instruments Inc., Plainview, NY (US)

( * ) Notice: Subject to any disclaimer, the term of this patent is extended or adjusted under 35 U.S.C. 154(b) by 0 days.

(21) Appl. No.: 10/164,460

(22) Filed: Jun. 6, 2002

(65) Prior Publication Data

US 2002/0153480 A1 Oct. 24, 2002

Related U.S. Application Data

(62) Division of application No. 09/824,452, filed on Apr. 2, 2001, now Pat. No. 6,410,907, which is a continuation of application No. 09/398,698, filed on Sep. 20, 1999, now Pat. No. 6,246,052.

(51) Int. Cl.[7] .................................................. G21R 5/10
(52) U.S. Cl. .......................... 250/234; 250/216; 33/568
(58) Field of Search ................................. 250/234, 235, 250/236, 216, 239, 201.3, 557; 33/568, 556, 572; 248/560, 570, 176.1, 178.1; 108/137

(56) References Cited

U.S. PATENT DOCUMENTS

| | | | |
|---|---|---|---|
| 3,928,778 A | 12/1975 | Ivanov | 310/331 |
| 4,559,717 A | 12/1985 | Scire et al. | 33/568 |
| 5,313,332 A | 5/1994 | Schell et al. | 359/813 |
| 5,360,974 A | * 11/1994 | Hammond et al. | 33/568 |
| 5,374,556 A | 12/1994 | Bennett et al. | 435/287.3 |
| 5,656,769 A | 8/1997 | Nakano et al. | 73/105 |
| 5,808,435 A | * 9/1998 | Mager | 318/598 |
| 6,018,991 A | 2/2000 | Nakano | 73/105 |

* cited by examiner

Primary Examiner—Kevin Pyo
(74) Attorney, Agent, or Firm—Wood, Herron & Evans, L.L.P.

(57) ABSTRACT

A flexure carriage assembly (24) has a carriage (25) formed of a substantially rigid material. The carriage has four elongate columns (32A, 32B, 32C, 32D) arranged spaced apart and parallel to one another. Each of the elongate columns has first and second ends. The flexure carriage (25) has four first cross members disposed between adjacent pairs of elongate columns and arranged to interconnect the first ends. The flexure carriage also includes four second cross members (38A–D) arranged between adjacent pairs of elongate columns and arranged to interconnect the bottom ends. The elongate columns and first and second cross members define a three-dimensional rectangular structure. The flexure carriage also has disposed centrally between the four elongate columns a translating section (29) spaced equidistant between the first and second ends of the columns. A plurality of flexures (50) are disposed between the translating element and elongate columns and between the elongate columns and first and second cross members in order to permit precise movement of the translating section (20) in a plane according to applied forces against edges of the translating section. A pair of piezoelectric assemblies (26) are connected to the translating section. One applies force to the translating section in a first linear path and the other applies force to the translating section in a second linear path perpendicular path.

19 Claims, 5 Drawing Sheets

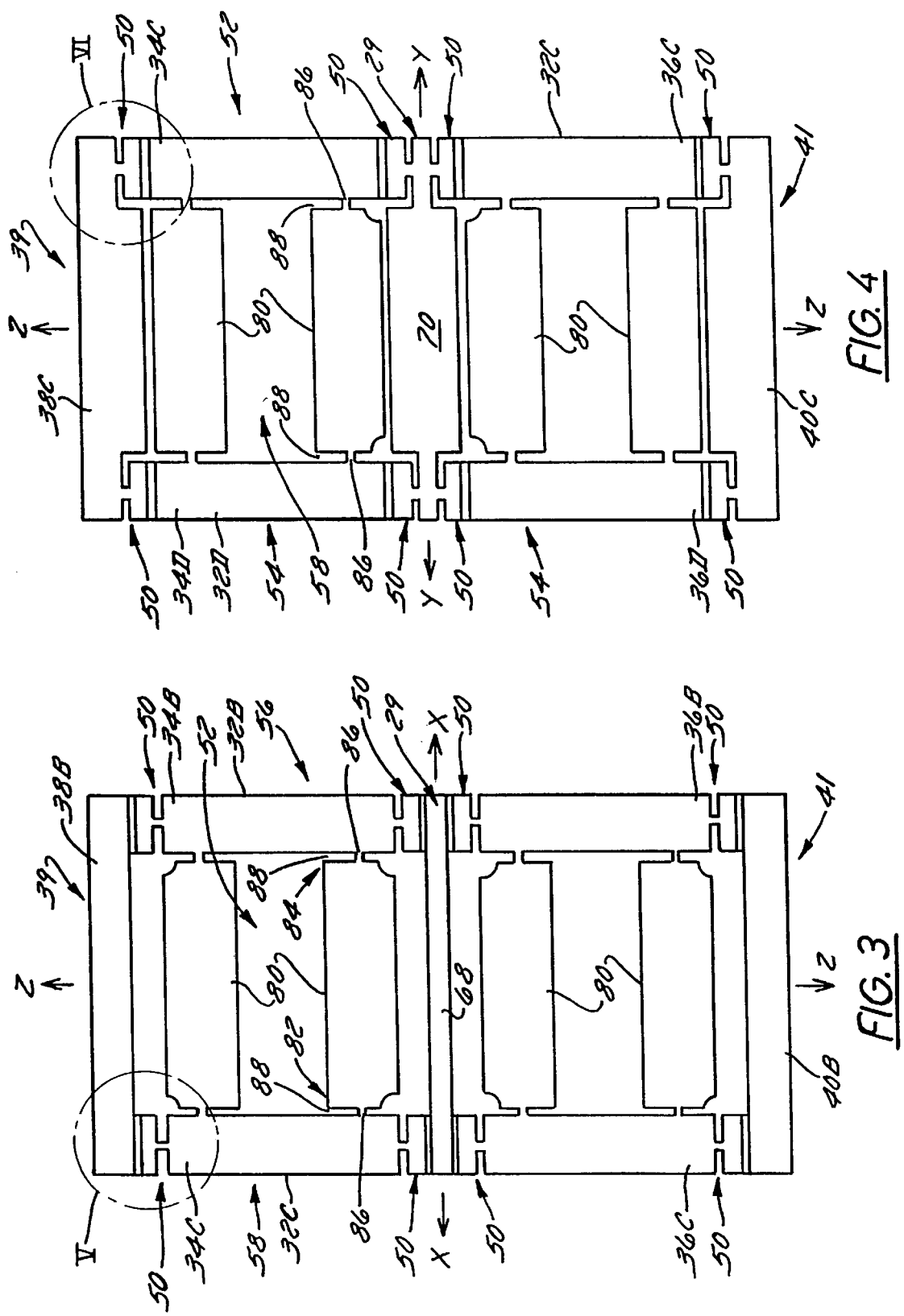

FLEXURE ASSEMBLY FOR A SCANNER

CROSS-REFERENCE TO RELATED APPLICATIONS

This application is a divisional of U.S. patent application Ser. No. 09/824,452, filed on Apr. 2, 2001, now U.S. Pat. No. 6,410,907, and which is a continuation of U.S. Patent application Ser. No. 09/398,692 filed on Apr. 2, 2001, U.S. Pat. No. 6,246,052, issued Jun. 12, 2001, entitled "Flexure Assembly For A Scanner."

BACKGROUND OF THE INVENTION

1. Field of the Invention

The present invention relates generally to a high resolution measuring device, and more particularly to a flexure assembly of a micro scanning device.

2. Discussion of the Related Art

Flexure carriages and devices are known in the art and are used for high resolution instrumentation and measuring equipment such as scanning probe microscopes and the like. These flexure devices typically carry thereon a probe or a sensor, or a specimen to be analyzed. Either the specimen or the probe is moved in very small increments in a plane relative to the other for determining surface or subsurface characteristics of the specimen. These devices are typically designed so as to move highly precisely and accurately in an X-Y plane and yet move very little in a Z direction perpendicular to the X-Y plane. The sensing probe typically measures surface defects, variation of the specimen's components, surface contour or other surface or subsurface characteristic. These types of devices may also be designed and utilized for other applications as well, such as imaging and measuring properties of computer microchips, computer disc surfaces, and other physical or chemical properties. The range of measurement for such devices is typically on the order of one Angstrom (Å) to several hundred microns ($\mu$).

In order to provide this type of extremely high resolution measurement, these devices require precise and minute micro-positioning capabilities within an X-Y plane and yet ideally permit no movement in a Z direction perpendicular to the plane. The flexure devices or carriages which hold the sensing probe or specimen of such devices are designed and utilized to provide just such movement.

A known flexure carriage construction uses a piezoelectric actuator which utilizes an applied electric potential to micro-position portions of the flexure devices. Conventional or known devices typically can only provide very flat movement in an X-Y plane over a very small relative area. The larger the range of movement, the greater the out-of-plane movement becomes, (i.e., the motion becomes increasingly curved or less flat). This is because of the construction and arrangement of the piezoelectric element in the devices. The piezoelectric elements bend partially out of their longitudinal axis and therefore apply out of axis forces which induce errors. The out of axis forces and resultant errors increase with increased expansion of the piezoelectric elements.

One device, disclosed in U.S. Pat. No. 5,360,974 and assigned to International Business Machines Corporation of Armonk, N.Y., provides a fairly flat movement in an X-Y direction or plane utilizing a dual frame arrangement where each frame is supported in opposite directions by flexible legs. Any Z direction motion perpendicular to the plane of one frame of the device is cancelled by movement of the other frame to maintain a very flat movement. However, the disclosed device utilizes long external piezoelectric elements which are oriented parallel to the plane of movement in order to eliminate or reduce rotation or yaw produced by the device. Such a device is much too large in certain applications.

Applications that employ such minute micro-positioning and sensing technology increasingly demand higher resolution measurements. For example, computer technology continues to reduce the size and increase the package density for the electronic elements in microchips and circuits. Meanwhile, the volume in which they are being produced and thus the size of the wafers on which they are made is also increasing. It is therefore becoming increasingly necessary to provide flexure devices which are capable of relatively large ranges of movement in an X-Y plane, which prevent movement in a Z axis perpendicular to the plane, and which are relatively small in size so that they may be utilized in equipment that must be smaller, less expensive and more accurate. It should be understood that while measurement on a smaller scale is being discussed, changes to a sample on similar scales, such as nanolithography and micro-machining, may also need to be performed with this level of accuracy. Thus, the discussion herein is intended to encompass fabrication as well as measurement.

SUMMARY OF THE INVENTION

The present invention is therefore directed to an improved flexure carriage and assembly useful in high resolution measurement and fabrication devices and instruments. The flexure carriage of the invention provides extremely flat and true movement in an X-Y direction or plane and prevents movement in a Z direction perpendicular to the X-Y plane. Additionally, the flexure carriage of the invention is capable of producing a relatively large range of motion in both the X and the Y direction while producing such a flat plane of motion. The flexure carriage of the invention produces such advantages and yet may be constructed in a relatively small and very sturdy or stiff package to produce the very flat plane of motion in the X and Y directions.

To accomplish these and other objects, features and advantages of the invention, a flexure assembly or carriage is disclosed. In one embodiment the flexure carriage of the invention is formed of a substantially rigid material and has four elongate columns arranged spaced apart and parallel to one another. Each of the elongate columns has a first and a second end. The carriage also has four first cross members arranged so that each first cross member extends between and interconnects two first ends of the elongate columns. The carriage also has four second cross members arranged so that each second cross member extends between and interconnects two second ends of the elongate columns. The carriage has a translating section that is disposed within a space between the elongate columns generally equadistant between the first and second ends of the elongate columns. The translating section is interconnected to the elongate columns. The carriage has a plurality of flexures wherein one flexure interconnects each first end of each elongate column to each first cross member. One flexure interconnects each second end of each elongate column to each second cross member. At least one flexure interconnects each elongate column with a translating section. The flexures permit the translating section to move according to an applied force in a plane which is essentially perpendicular to the orientation of the elongate columns. The symmetry of the flexure carriage eliminates virtually any movement in a Z direction perpendicular to the X-Y plane.

In one embodiment, a pair of flexures interconnect each elongate column with the translating section. One flexure of each pair is disposed adjacent the translating section on each elongate column nearer the first end. The other flexure of each pair is disposed adjacent the translating section on each elongate column nearer the second end.

In one embodiment, each flexure of the flexure carriage includes a first pair of opposed slots formed transversely and extending toward one another into one of the elongate columns. A first web of the substantially rigid material is left remaining between the first pair of slots. A second pair of opposed slots are spaced from the first pair of slots in the same elongate column and formed transversely and extending toward one another into the elongate column. A second web of the substantially rigid material is left between the second pair of slots. The first web and the second web are arranged perpendicular to one another and spaced apart along the same elongate column.

In one embodiment, a flexure carriage as described above, is provided with a first piezoelectric assembly connected to the translating section for moving the translating section along only a first linear path generally perpendicular to the elongate columns. A second piezoelectric assembly is connected to the translating section for moving the translating section along only a second linear path generally perpendicular to the elongate columns and perpendicular to the first linear path.

In one embodiment, a high resolution measurement device is constructed according to the invention and has a support structure carrying various elements of the device. The measurement device also has a measuring instrument which is carried by the translating section of a flexure carriage provided as described above. Each of the piezoelectric assemblies is affixed at one portion to the support structure of the measurement device and affixed to a portion of the translating section of the flexure carriage for providing applied forces to the translating section for moving the translating section and the measuring instrument therewith.

These and other objects, features and advantages of the present invention will be better understood and appreciated when considered in conjunction with the following detailed description and accompanying drawings. It should be understood however that the following description is given by way of illustration and not of limitation though it describes several preferred embodiments. Many changes and modifications may be made to the disclosed embodiments without departing from the spirit and scope of the present invention and the invention is intended to include all such modifications.

BRIEF DESCRIPTION OF THE DRAWINGS

Several embodiments of the present invention are illustrated in the accompanying drawings in which like reference numerals represent like parts throughout, and in which:

FIG. 3 illustrates a plan view of one side of the flexure carriage which is arbitrarily designated as the side;

FIG. 4 illustrates a plan view of another side of the flexure carriage illustrated in FIG. 3 rotated 90 degrees on a vertical axis Z and arbitrarily designated as the back;

DETAILED DESCRIPTION OF THE PREFERRED EMBODIMENTS

The present invention generally discloses a micropositioning motion transducer in the form of a flexure device. The flexure device includes a rigid frame or support structure securely carrying a flexure carriage assembly. The flexure carriage assembly includes a carriage having a plurality of structures which permit high precision translational movement in an X and a Y direction defining a substantially flat plane of movement. The structure precisely transmits forces at least partially applied in the X direction that are converted to translational movement of a translational section only in the X direction. The structure also transmits forces at least partially applied in the Y direction into translational movement of the translational section only in the Y direction. The structure essentially prevents any substantial movement of the translational section of the carriage in a Z direction perpendicular to the X-Y plane. The flexure carriage assembly includes a pair of piezoelectric assemblies that drive the translating section of the flexure carriage. One piezoelectric element drives the translating element in the X direction and the other piezoelectric element assembly drives the translating element in the Y direction. The piezoelectric assemblies are oriented substantially parallel to the Z axis, though they impart precision movement in the X-Y plane perpendicular to the Z axis.

Figure 1:
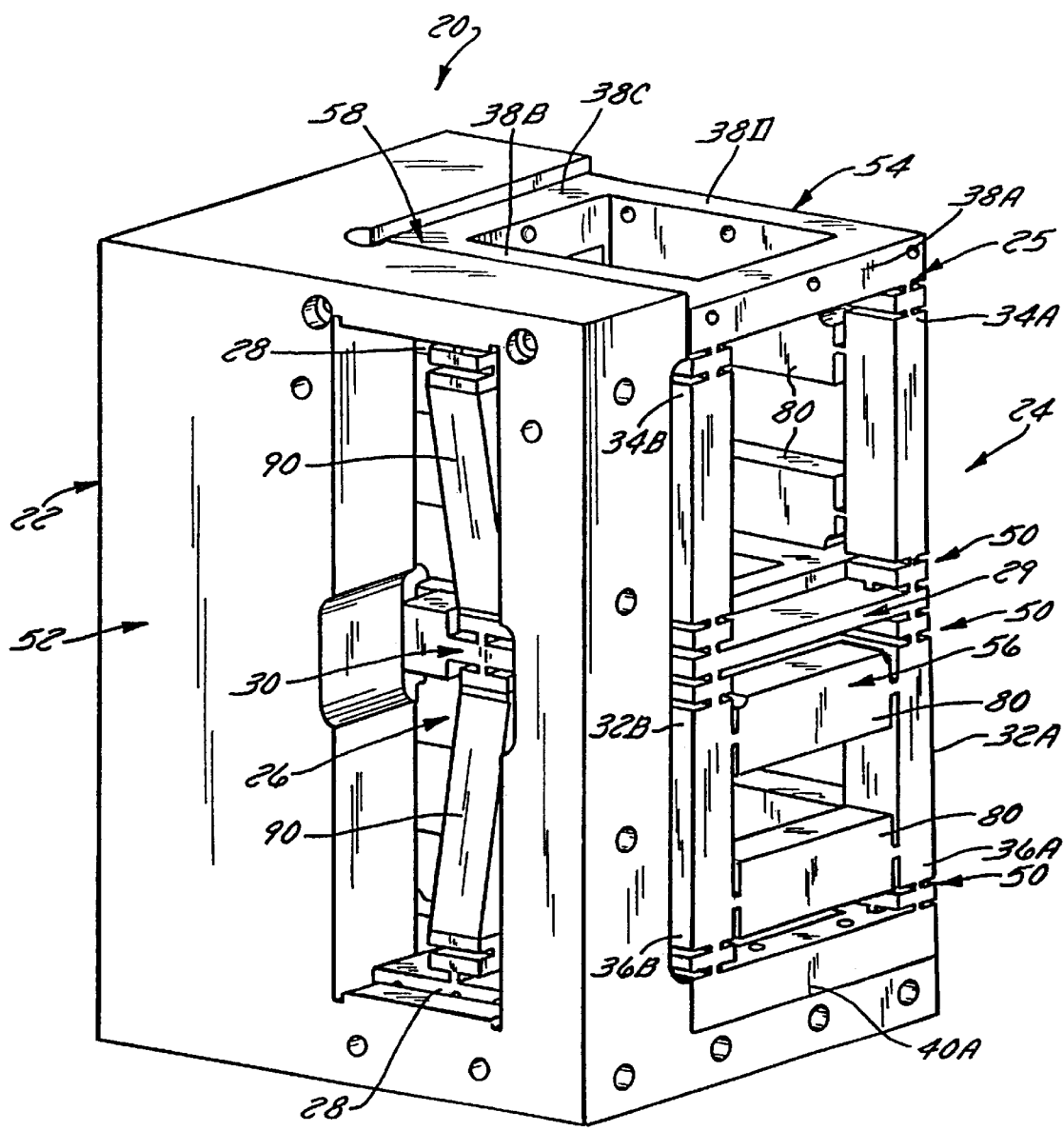
FIG. 1 illustrates an elevational perspective view of a flexure assembly constructed in accordance with one embodiment of the present invention.

Referring now to the drawings, FIG. 1 illustrates generally a flexure device 20 having a frame or support structure 22 and a flexure carriage assembly 24 rigidly affixed to and supported by the frame. The carriage assembly 24 includes a carriage 25 and also includes a pair of piezoelectric assemblies 26 each having opposed distal end couplers 28 fixed to the frame 22. The piezoelectric assemblies 26 have a central coupler 30 fixed to a translating section 29 of the flexure carriage 25. In general, the frame or support structure 22 can be a separate frame element as is illustrated in FIG. 1 that is farther attached to a suitable instrument or device. Alternatively, the frame 22 can be an integral portion of the instrument or device (not shown). The piezoelectric elements 26 are energized from a source of electric energy (also not shown) and, in accordance with known principles of such elements, the piezoelectric assemblies 26 move according to the applied energy. Since the elements have a central coupler 30 coupled to the translating section 29 of the flexure carriage 25, the translating section as described in detail below, moves in accordance with the motion of the piezoelectric assemblies 26. As described and shown herein, the movement of the piezoelectric assemblies 26 and the translating section 29 of the flexure carriage 25 is highly precise and has a relatively large range of motion. However, as discussed above, the typical and desirable range of motion for such a device is small in reality, for example, on the order of one Å to about a few hundred μ.

Figure 2A:
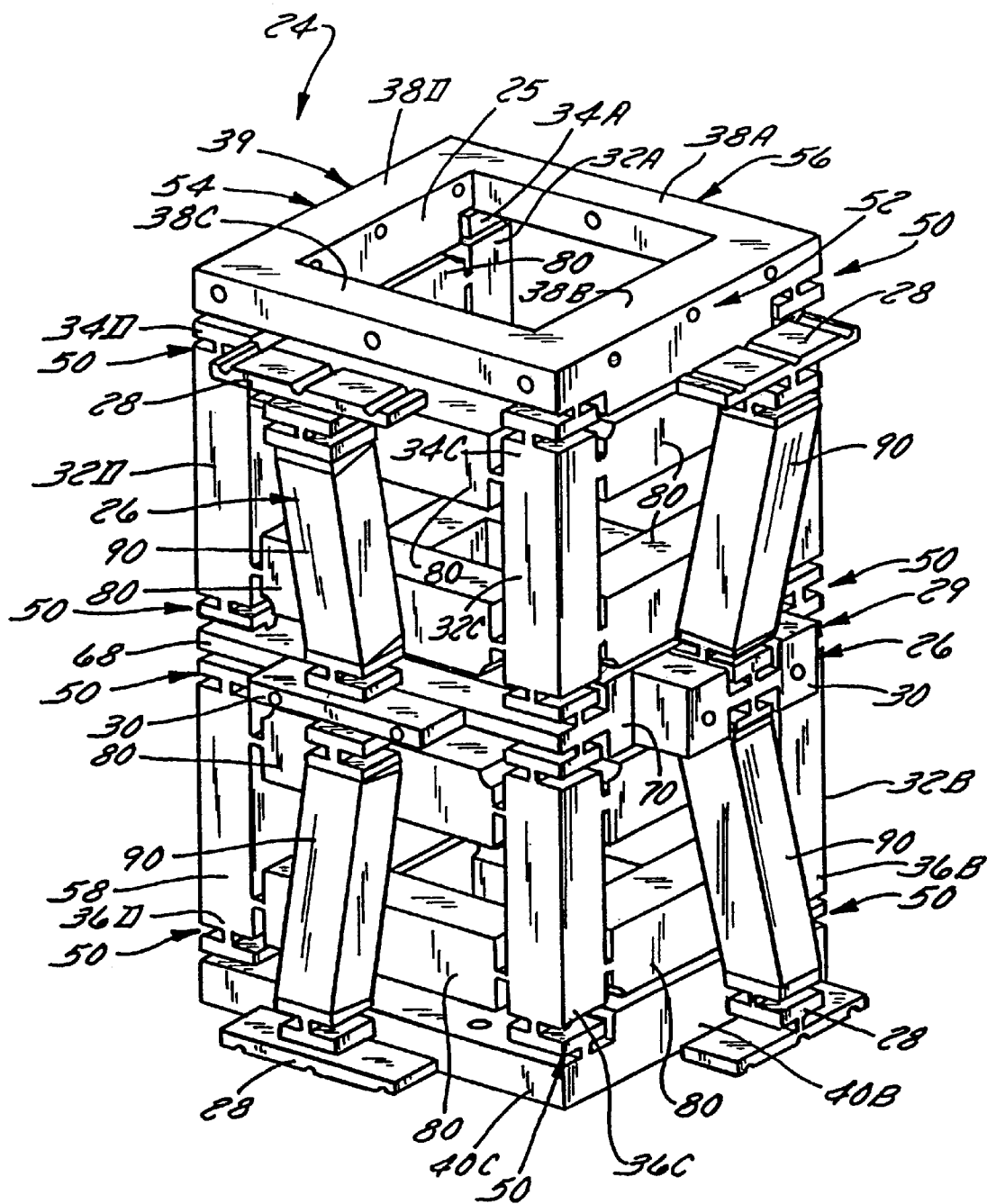
FIG. 2A illustrates an elevational perspective view of the flexure carriage assembly of the flexure assembly illustrated in FIG. 1.
Figure 2B:
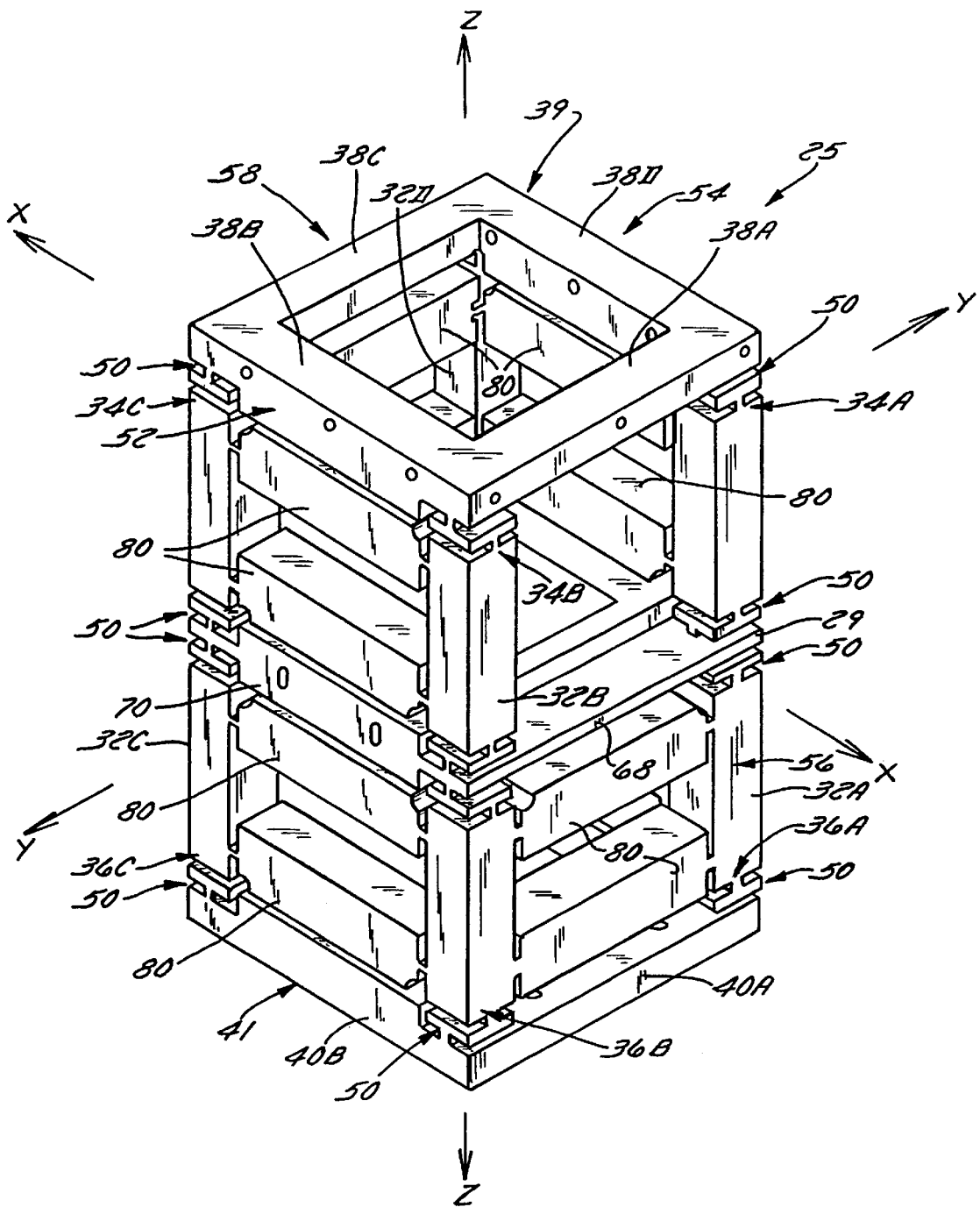
FIG. 2B illustrates an elevational perspective view of the flexure carriage of the assembly shown in FIG. 2A.

FIG. 2A illustrates the flexure carriage assembly 24 in perspective view. FIG. 2B illustrates the carriage 25 in perspective view. FIGS. 3 and 4 illustrate two sides in plan view of the carriage 25 which have been arbitrarily selected for illustration. The carriage need not have a front, back and designated sides. However, for illustrative purposes, FIG. 3 illustrates a view arbitrarily shown as a back surface of the carriage 25, and FIG. 4 illustrates a side surface of the carriage which can be either side of the carriage when the carriage is rotated 90 degrees about a vertical axis relative to the views in FIGS. 3 and 4.

Turning again to FIGS. 2–4, the flexure carriage 25 of the carriage assembly 24 is in the form of a rectangular three-dimensional structure. The carriage 25 is preferably made from a substantially rigid material such as stainless steel or the like wherein the material is not too brittle, soft or flexible so that it may perform the intended functions of the invention. The carriage 25 is comprised of a substantially symmetrical structure and is described herein including a top and bottom end as well as front, rear and side surfaces. However, these designations are arbitrarily selected and utilized only for simplicity of description. It will be obvious to one of ordinary skill in the art that the carriage as well as the flexure device 20 can be oriented in any manner and manipulated to any orientation without departing from the scope of the invention.

With that in mind, FIG. 2A illustrates the flexure carriage assembly 24 and FIG. 2B illustrates the carriage 25. The carriage 25 includes four elongate vertical columns disposed parallel to one another and spaced equal distance from one another. Each of the elongate columns includes a first end, herein designated as a top end and a second end, herein designated as a bottom end. The four elongate columns are identified herein for simplicity as 32A, 32B, 32C and 32D. The respective top ends are identified as 34A, 34B, 34C and 34D. The respective bottom ends 36 are represented by 36A, 36B, 36C and 36D. Each of the elongate columns is essentially the same length and oriented so that each of the top ends terminate in the same plane relative to one another and each of the bottom ends terminate in the same plane relative to one another.

Each of the top ends of the carriage 25 are interconnected to adjacent top ends of corresponding elongate columns by first cross members 38 A–D. For example, the cross member 38A extends between the top ends 34A and 34B of the adjacent elongate columns 32A and 32B. Similarly, the cross member 38B extends between the top ends 34B and 34C, the cross member 38C extends between the top ends 34C and 34D, and the cross member 38D extends between the top ends 34D and 34A. The first cross members 38 A–D combine to define an arbitrary top 39 of the carriage 25.

Similarly, four second cross members 40 A–D extend between the bottom ends 36 A–D of the elongate columns 32 A–D in an identical manner. The four second cross members 40 A–D combine to define an arbitrary bottom 41 of the carriage 25. Each of the cross members 38 A–D and 40 A–D are arranged at right angles relative to one another when viewed from either the top 39 or the bottom 41 of the carriage 25. Thus, the combination of the cross members 38 A–D and 40 A–D along with the elongate columns 32 A–D define a right angle three dimensional parallelogram. In the present embodiment, all of the cross members are of equal length so that the top 39 and bottom 41 are square. A symmetrical shape is preferred for the carriage but the overall cross section need not be a square shape in order to fall within the scope of the invention.

The elongate columns 32 A–D and the cross members 38 A–D and 40 A–D are each preferably integrally formed with one another and therefore, without more, would form a rigid frame structure. However, the carriage 25 of the flexure device 20 must allow for certain flexible movements as described below in detail. The flexible nature of the carriage 25 is provided by adding a plurality of flexures 50 to the structure of the carriage 25. The construction of one flexure 50 is now described in detail below. Subsequently, the placement of the flexures 50 on the carriage 25 is described along with the function and flexible nature of the carriage.

In order to simplify the description of the carriage 25, a coordinate system is arbitrarily chosen and utilized in conjunction with the discussion herein. Referring to FIG. 2B, an X axis or X coordinate is defined along one axis perpendicular to the four elongate columns 32 A–D and perpendicular to arbitrary side surfaces 52 and surface 54. A Y axis as illustrated in FIG. 2B is perpendicular to the X axis and also perpendicular to an opposed front 56 and back 58 of the carriage 25. The front and back 56 and 58, respectively, are perpendicular to the sides 52 and 54. A Z axis is also illustrated in FIG. 2B disposed parallel to and between to the four elongate columns 32 A–D and perpendicular to the X-Y plane. The arbitrary back 58 is illustrated in FIG. 4 and the arbitrary side 52 is illustrated in FIG. 3.

Figure 5:
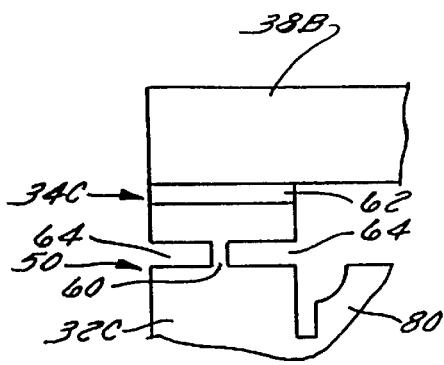
FIG. 5 illustrates an enlarged view of a flexure of the flexure carriage illustrated in circle V of FIG. 3.
Figure 6:
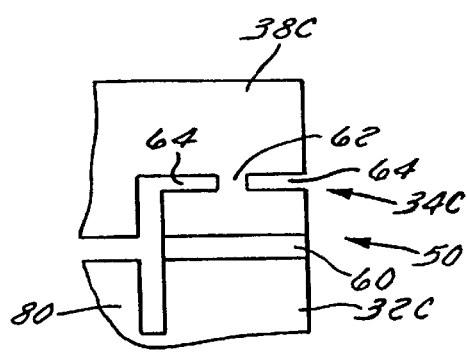
FIG. 6 illustrates an enlarged view of a flexure of the flexure carriage illustrated in circle VI of FIG. 4.

FIG. 5 illustrates the construction of one flexure 50 taken at the juncture between the elongate column 32C at its top end 34C and the cross member 38B. FIG. 6 illustrates the same flexure 50 viewed 90 degrees relative to the flexure shown in FIG. 5.

Each flexure 50 includes an interior first material web 60 nearer the X and Y plane and an exterior second material web 62 nearer either the top 39 or bottom 41 of the carriage and essentially perpendicular relative to the first material web 60. Each material web is formed by creating a pair of opposed slots 64 perpendicularly or transversely into opposed surfaces of the appropriate elongate column 32. Thus, each material web 60 and 62 is a thin web or membrane of material between the slots 64 and extends the entire width of the appropriate elongate column 32 when viewed into one of the slots 64. Therefore, the view of the flexure 50 in FIG. 5 shows the interior material web 60 on an end view so that the thin-walled construction is visible. The exterior material web 62 is illustrated lengthwise. The same flexure 50 is illustrated in FIG. 6 where the interior material web 60 is lengthwise and the exterior material web 62 is in an end view.

Each flexure 50 permits linear movement in the X direction and the Y direction but not in the Z direction. The web 60 will permit slight lateral movement of the elongate column 32C relative to the cross member 38B when a force is applied in the X direction. The web 62, because it is oriented lengthwise in the X direction and rigidly connected to both the cross member 38B and the elongate column 32C, prevents movement in the X direction. However, when viewed at a 90 degree angle as shown in FIG. 6, the web 62 permits movement in the Y direction upon an applied Y direction force.

Each flexure 50 therefore permits movement in the X direction and the Y direction upon an applied force, respectively, in the X or the Y direction. Each flexure 50 also prevents any movement in the Z direction based on the rigid connections between each structural element connected to each flexure 50. The construction of each flexure 50 also enhances direct movement only in the direction of the applied force in that one web is oriented to permit movement only in one linear direction wherein the other web is oriented to permit movement in only one linear direction perpendicular to the linear direction of movement for the other web. Each web is also constructed to prevent any movement at that web other than in its intended direction of movement. Therefore, each flexure 50 provides a precise X or Y flexure according to the applied force and prevents any other movement and particularly prevents movement in the Z direction.

As best illustrated in FIG. 2A, a flexure 50 is disposed at each top end 34 A–D and each bottom end 36 A–D between the respective elongate columns 32 A–D and cross members 38 A–D and 40 A–D. Each flexure 50 disposed at the top ends 34 of the elongate columns 32 is oriented so that all interior webs 60 are oriented in the same direction relative to one another and all exterior webs 62 are oriented in the direction relative to one another. Each of the flexures 50 disposed at the bottom ends 36 of the elongate columns 32 is also oriented identically relative to one another. Each flexure 50 disposed at opposite ends of each of the elongate columns 32 A–D are preferably oriented as mirror images of one another to provide symmetry in the construction of the carriage 25. For example, the flexures 50 on ends 34A and 36A of the elongate column 32A each have the exterior material webs 62 oriented parallel relative to one another and have the interior material webs 60 oriented parallel relative to one another.

Each of the elongate columns 32 A–D also has at least one, and preferably, a pair of flexures 50 disposed near the center defined by the X axis and Y axis noted in FIG. 2A with one flexure 50 being disposed on each side of the mid-line or X-Y plane. Again, each of these interior flexures 50 are disposed so that they are mirror images relative to one another. Therefore, the interior material webs 60 are oriented parallel relative to one another and the exterior material webs 62 are also oriented parallel relative to one another. Additionally, each of the flexures disposed near the mid-line 50 is oriented identically on each of the elongate columns 32 A–D to provide uniform flexure.

Figure 7:
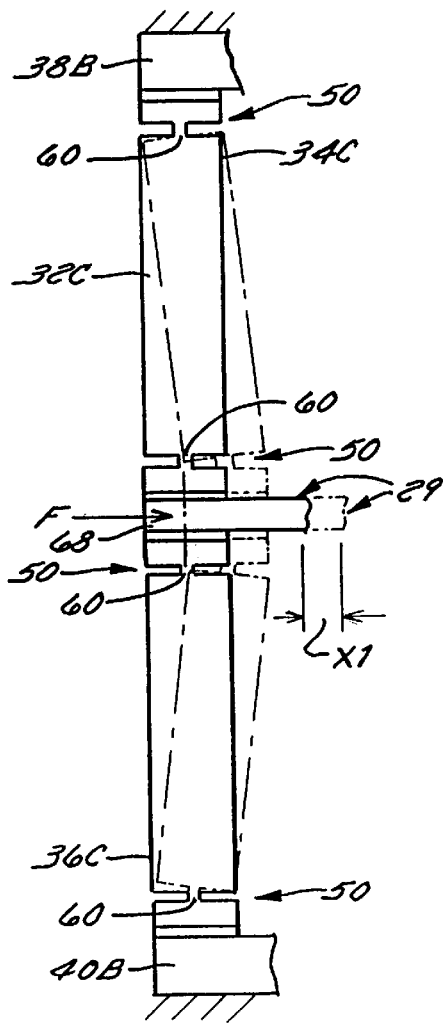
FIG. 7 is a sectional elevation view of a portion of the flexure carriage, illustrating the flexure carriage in an at-rest position in solid lines and in a deflected position in phantom lines.

The translating section 29 is connected to each of the mid-line flexures 50 of the carriage. The translating section 29 is disposed corresponding to the X-Y plane of the carriage 25 so that the carriage is essentially symmetrical on either the top portion or the bottom portion of the carriage 25 relative to the translating section 29. A force F applied to a back surface 68 of the translating member in the X direction will cause all of the flexures 50 to flex at the appropriate material web to permit movement in the X direction as seen in phantom lines in FIG. 7. Because the carriage 25 is constructed symmetrically, any small movement in a Z direction of any particular flexure 50 on one side of the X-Y plane is negated by mirror image movement of the corresponding flexure on the other side of the X-Y plane. This mirror image movement also offsets emperical strain on the carriage during microactuator actuation. Thus, the translating section 29 moves in a very flat movement along the X-Y plane at the center axis of the carriage.

A force applied to a side surface 70 of the translating section 29 in the Y direction causes each flexure 50 to bend slightly about the appropriate material web oriented to permit movement in the Y direction. Again, because of the symmetry of the structure, movement in the Y direction of the translating section 29 will be a very flat planar movement along the X-Y plane. Because of the construction of the flexures 50 and the carriage 25, any load applied along the Y axis is transmitted as movement only in the Y direction and yields no movement in the X or the Z direction. Loads applied in both the X direction and the Y direction simultaneously will move the translating section 29 in both the X direction and the Y direction but only for a distance according to the force vectors in each direction respectively. An X direction force produces no substantial movement in the Y direction, and a Y direction force produces no substantial movement in the X direction. Therefore, extremely accurate results are produced by utilizing the carriage assembly 24 of the invention.

As illustrated in FIGS. 3 and 4, the carriage 25 includes a plurality of stiffening beams 80 spanning each adjacent pair of elongate columns 32 A–D and running essentially parallel to the top and bottom cross members 38 A–D and 40 A–D. Each stiffening beam 80 is connected to an elongate column 32 A–D at its opposite ends 82 and 84 by a material web 86. Each material web 86 is formed similar to any one of the material webs 60 or 62 described above in that a pair of opposed notches or slots 88 are cut into the carriage material adjacent to each of the ends 82 and 84 to form a thin web of material interconnecting the stiffening beams 80 to the elongate columns 32 A–D. Each stiffening beam 80 essentially locks the adjacent elongate columns 32 A–D laterally relative to one another so that if they move in either the X or the Y direction, they will move in tandem and not move closer to or further away from one another. However, the web 86 at each end of each stiffening beam permits the stiffening beams to pivot slightly relative to the respective one of the elongate columns 32 A–D so that the carriage 25 can perform its intended flexure function by allowing the translating section 29 to move in the X-Y plane.

As illustrated in FIGS. 3 and 4, the front 56, back 58, and sides 52 and 54 can include a stiffening beam 80 adjacent to each of the flexures 50 to provide lateral support to the carriage structure. As illustrated in FIGS. 1 and 2B, one side, such as the front 56, can be devoid of a stiffening beam to permit access to the interior of the carriage 25. Access may be necessary in order to activate or install or replace a sensor probe (not shown) or other apparatus attached to or carried by the translating section 29 of the flexure device. The number of stiffening beams 80 as well as the position or location of the stiffening beams can vary considerably without departing from the scope of the present invention. The addition and strength of the stiffening beams is determined by the particular application for which the flexure device 20 is intended. Some applications may require a stiffer carriage 25 while other applications may require a more flexible structure.

As illustrated in FIGS. 1 and 2A, the back 58 and one side 52 are coupled to the piezoelectric assemblies 26.

Figure 8:
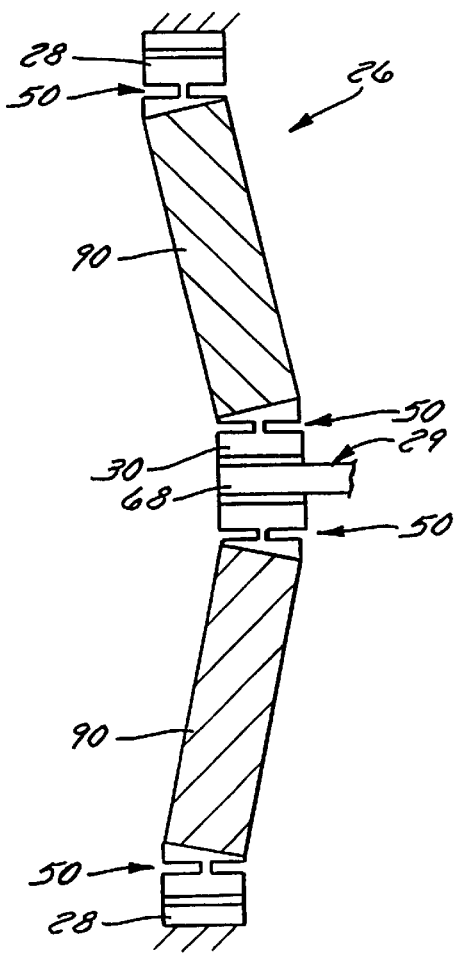
FIG. 8 is a sectional side elevation view of another portion of the flexure carriage.

In the present embodiment, each piezoelectric assembly 26 has a pair of piezoelectric elements 90 extending symmetrically outward from a central block coupler 30 as illustrated in FIGS. 2A and 8. The coupler 30 is rigidly affixed to the back surface 68 of the translating section 29 for movement therewith. The coupler 30 includes a pair of symmetrically opposed flexures 50 essentially identical in construction to those described above for the carriage 25. Each of the flexures 50 is attached to one of the piezoelectric elements 90. Each piezoelectric element 90 is attached at their opposite distal ends to a corresponding end coupler 28, which is rigidly affixed to the frame or support structure 22 and retained thereby. Each of the end couplers 28 also includes a flexure 50 for coupling the piezoelectric elements 90 to the end couplers 28.

Each piezoelectric element 90 is electrically connected to a power supply (not shown) wherein the power supply is utilized to energize each piezoelectric element and to move each element and hence the translating section 29. The flexures at each coupler 30 and 28 permit the piezoelectric elements 90 to drive the central coupler 30 and hence the translating section 29 as described above in either the X direction or the Y direction or both depending on how the piezoelectric assemblies 26 are energized.

The piezoelectric elements 90 are intended to be identical in nature for each piezoelectric assembly 26 so that each piezoelectric element 90 of a particular assembly produces an equivalent movement. This insures that no out of balance force is applied to the translating section 29. Additionally, the movement produced by each piezoelectric assembly 26 is essentially only in the X or the Y direction because of the symmetrical construction of the piezoelectric assemblies 26 and because each end coupler 28 is rigidly affixed to the frame 22. Any movement which would otherwise be created in the Z direction at one end of the piezoelectric assembly is cancelled by an opposite and equal reaction at the other end of the assembly 26.

As illustrated in FIG. 2A, the central couplers 30 of each piezoelectric assembly 26 are different in construction. However, the only difference is in the size of the rigid central portion of the couplers 30 affixed to the translating section 29. The size of this central portion of the central couplers is merely adapted to coincide or correspond to the size and shape of the particular surface 68 or 70 of the translating section 29 to which the coupler is attached. The shape and construction of the end couplers 28 as well as the central couplers 30 may vary considerably without departing from the scope and spirit of the invention. Additionally, the particular size, type and configuration of the piezoelectric elements may also vary considerably. The invention is not intended to be limited to any particular piezoelectric element construction.

To summarize the invention, the structure of the flexure carriage 25 transmits an applied force in the X direction into an X direction movement of the translating section 29 without producing any movement in the Y direction or the Z direction. Similarly, an applied force in the Y direction produces movement of the translating section 29 only in the Y direction without producing any movement in the X direction or the Z direction. An applied force by both of the piezoelectric assemblies 26 produces corresponding movement in both the X and the Y direction wherein the movement in the X direction corresponds only to the applied X direction force and movement in the Y direction corresponds only to the applied Y direction force. The construction of the flexure device of the invention produces a highly accurate X-Y coordinate movement and produces such movement in a very flat X-Y plane virtually over a relatively large area while eliminating any significant movement of the translating section in the Z direction.

Many modifications and changes to the invention as described may be made without departing from the spirit and scope of the invention. For example, the size, shape and construction of each of the elongate columns 32 A–D, cross members 38 A–D and 40 A–D, flexures 50, material webs 60, 62, and 84, slots 64 and 86, and translating sections 29 may vary considerably without departing from the invention. The size, shape and construction as well as the materials utilized to produce the flexible carriage 25 may be selected and determined according to a particular application for which the device 20 is intended. The compact nature of the overall carriage assembly 24 including the piezoelectric elements 26 permits utilizing the invention in application environments smaller than previously possible. This is accomplished by the novel construction of the invention wherein the piezoelectric assemblies 26 are oriented in the Z direction relative to the X-Y plane of movement of the translating section produced by the piezoelectric assemblies.

Other variations and modifications to the specifically described embodiments may be made without departing from the spirit and scope of the present invention. With that in mind, the invention is intended to be limited only by the scope of the appended claims.

What is claimed is:

1. An assembly comprising:
   (A) elongate columns each having a top end and a bottom end;
   (B) a translating section disposed between the elongate columns generally equidistant between the top and bottom ends and interconnected to the elongate columns; and
   (C) a flexure interconnecting each elongate column to the translating section.

2. The assembly of claim 1, wherein the elongate columns are essentially parallel to one another.

3. The assembly of claim 1, further comprising a carriage that moves in the X-Y coordinate plane and reduces movement of the translating section in the Z direction.

4. The assembly of claim 3, wherein the Z direction is perpendicular to the X-Y coordinate plane.

5. The assembly of claim 3, wherein the carriage is substantially symmetrical.

6. The assembly of claim 3, further comprising a rigid frame that supports the carriage.

7. The assembly of claim 1, further comprising:
   (1) upper cross members configured to connect the top ends of the elongate columns; and
   (2) lower cross members configured to connect the bottom ends of the elongate columns.

8. The assembly of claim 1, wherein the flexure further comprises:
   (1) a first web formed by a first pair of opposed slots which are formed transversely and extend toward one another in each of the elongate columns;
   (2) a second web formed by a second pair of opposed slots which are formed transversely in each elongate column and extend toward the first pair of opposed slots in the same elongate column; and
   wherein the first web and the second web are arranged perpendicular to one another and spaced apart along the same elongate column.

9. The assembly of claim 1, further comprising:
   (1) A first piezoelectric assembly connected to the translating section, wherein the first piezoelectric assembly moves the translating section along a first linear path; and
   (2) a second piezoelectric assembly connected to the translating section, wherein the second piezoelectric assembly moves the translating section along a second linear path.

10. The assembly of claim 9, wherein each piezoelectric assembly further comprises:
   (1) a central coupler having a rigid section connected to a portion of the translating section;
   (2) at least one flexure connected to the rigid section; and
   (3) first and second piezoelectric elements, wherein the first piezoelectric element extends from each flexure toward the top end of the elongate column and the second piezoelectric element extends from each flexure toward the bottom end of the elongate column.

11. The assembly of claim 10, wherein each flexure interconnects each first and second piezoelectric element with the rigid section.

12. The assembly of claim 1, further comprising a plurality of stiffening beams connected to the elongate columns.

13. The assembly of claim 6, wherein the rigid frame is stainless steel.

14. A carriage for micro-positioning comprising:
   (A) elongate columns each having a top end and a bottom end;
   (B) a translating section disposed between the elongate columns generally equidistant between the top and bottom ends and interconnected to the elongate columns;
   (C) a flexure interconnecting each elongate column to the translating section;
   (D) first and second piezoelectric assemblies connected to the translating section.

15. The carriage of claim 14, wherein the first piezoelectric assembly moves the translating section along a first linear path and wherein the second piezoelectric assembly moves the translating section along the second linear path.

16. The carriage of claim 14, wherein each piezoelectric assembly further comprises:
   (1) a central coupler having a rigid section connected to a portion of the translating section;
   (2) at least one flexure connected to the rigid section; and
   (3) first and second piezoelectric elements, wherein the first piezoelectric element extends from each flexure toward the top end of the elongate column and the second piezoelectric element extends from each flexure toward the bottom end of the elongate column.

17. A high resolution measurement device comprising:
   (A) a measuring instrument;
   (B) an assembly having a moveable carriage that support the measuring instrument for movement therewith, wherein the assembly further includes elongate columns arranged parallel to one another, each elongate column having a top end and a bottom end;
   (C) a support structure securely carrying the assembly;
   (D) a translating section disposed between the elongate columns generally equidistant between the top and bottom ends and interconnected to the elongate columns;
   (E) a flexure interconnecting each elongate column to the translating section;
   (F) a first piezoelectric assembly connected to the translating section, wherein the first piezoelectric assembly moves the translating section along a first linear path; and
   (G) a second piezoelectric assembly connected to the translating section, wherein the second piezoelectric assembly moves the translating section along a second linear path.

18. The high resolution measurement device of claim 17, wherein the movable carriage is substantially symmetrical.

19. The high resolution measurement device of claim 17, wherein the distance between the top end of the elongate column and the translating section and the bottom end of the elongate column and the translating section is equal.

* * * * *